(12) United States Patent
Gupta et al.

(10) Patent No.: US 8,190,135 B2
(45) Date of Patent: May 29, 2012

(54) ATTRIBUTE AND LOCATION BASED ENTITY PRESENTATION IN PRESENCE BASED COMMUNICATION SYSTEMS

(75) Inventors: Amit Gupta, Redmond, WA (US); Avronil Battacharjee, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 628 days.

(21) Appl. No.: 12/357,626

(22) Filed: Jan. 22, 2009

(65) Prior Publication Data

US 2010/0184416 A1    Jul. 22, 2010

(51) Int. Cl.
  *H04L 29/06* (2006.01)
(52) U.S. Cl. ............... 455/414.3; 455/414.1; 455/414.2; 455/456.1; 455/457
(58) Field of Classification Search ............... 455/414.1, 455/414.3, 456.1, 414.2, 457
See application file for complete search history.

(56) References Cited

U.S. PATENT DOCUMENTS

| 6,204,844 B1* | 3/2001 | Fumarolo et al. ............. 715/736 |
| 7,383,316 B2 | 6/2008 | Koch et al. |
| 7,540,419 B2 | 6/2009 | Amitay et al. |
| 2004/0192331 A1* | 9/2004 | Gorday et al. ............. 455/456.1 |
| 2005/0141479 A1 | 6/2005 | Ozugur et al. |
| 2007/0168558 A1 | 7/2007 | Taylor et al. |
| 2008/0133580 A1 | 6/2008 | Wanless et al. |
| 2008/0276197 A1 | 11/2008 | Diederiks et al. |
| 2008/0285542 A1 | 11/2008 | Jachner |
| 2009/0030999 A1 | 1/2009 | Gatzke et al. |

OTHER PUBLICATIONS

Contacts http://www.e4net.com/dnloads/WebHelp/contacts.htm.
Privacy-Preserving Techniques for Proximity Based LBS http://ieeexplore.ieee.org/stamp/stamp.jsp?arnumber=05088972.

\* cited by examiner

*Primary Examiner* — Nick Corsaro
*Assistant Examiner* — Amanuel Lebassi
(74) *Attorney, Agent, or Firm* — Turk IP Law, LLC

(57) ABSTRACT

Presence information and communication options for contact entities (people and other) of a user are provided to the user based on the user's own location. The user's location information is used as initial criterion to filter contact entities. Further filtering is performed based on presence attributes of nearby contacts such as their expertise, availability, location, and similar attributes. Prioritization and ordering may also be carried out based on the same criteria.

17 Claims, 7 Drawing Sheets

ATTRIBUTE AND LOCATION BASED ENTITY PRESENTATION IN PRESENCE BASED COMMUNICATION SYSTEMS

BACKGROUND

Telecommunication services evolved substantially in a relatively short time with the integration of computing technologies into telecommunication systems and devices. Cellular telephones are an illustrative example. The services provided through a cellular phone such as video streaming, image acquisition and transfer, music distribution, financial transactions, and many others are examples of activities that would have been impossible through conventional phone technologies.

The rapid development of capabilities and services provided through communication devices are not limited to cellular phones. Newer systems combine a variety of short range and long range communication capabilities over a number of networks including traditional phone networks, wireless networks, and similar ones. Telecommunication end devices as well as support devices and programs for such newer systems are more similar to computer networks than conventional telephone networks. Thus, a large number of capabilities may be added to those already provided by modem telecommunication devices and networks.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing presence information and communication options for contacts of a user based on the user's location. In an enhanced communication system utilizing presence information, the user's own presence information, particularly location information, may be used as initial criterion to filter contact entities. Further filtering may be performed based on presence attributes of nearby contacts such as their expertise, availability, location, and similar attributes.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
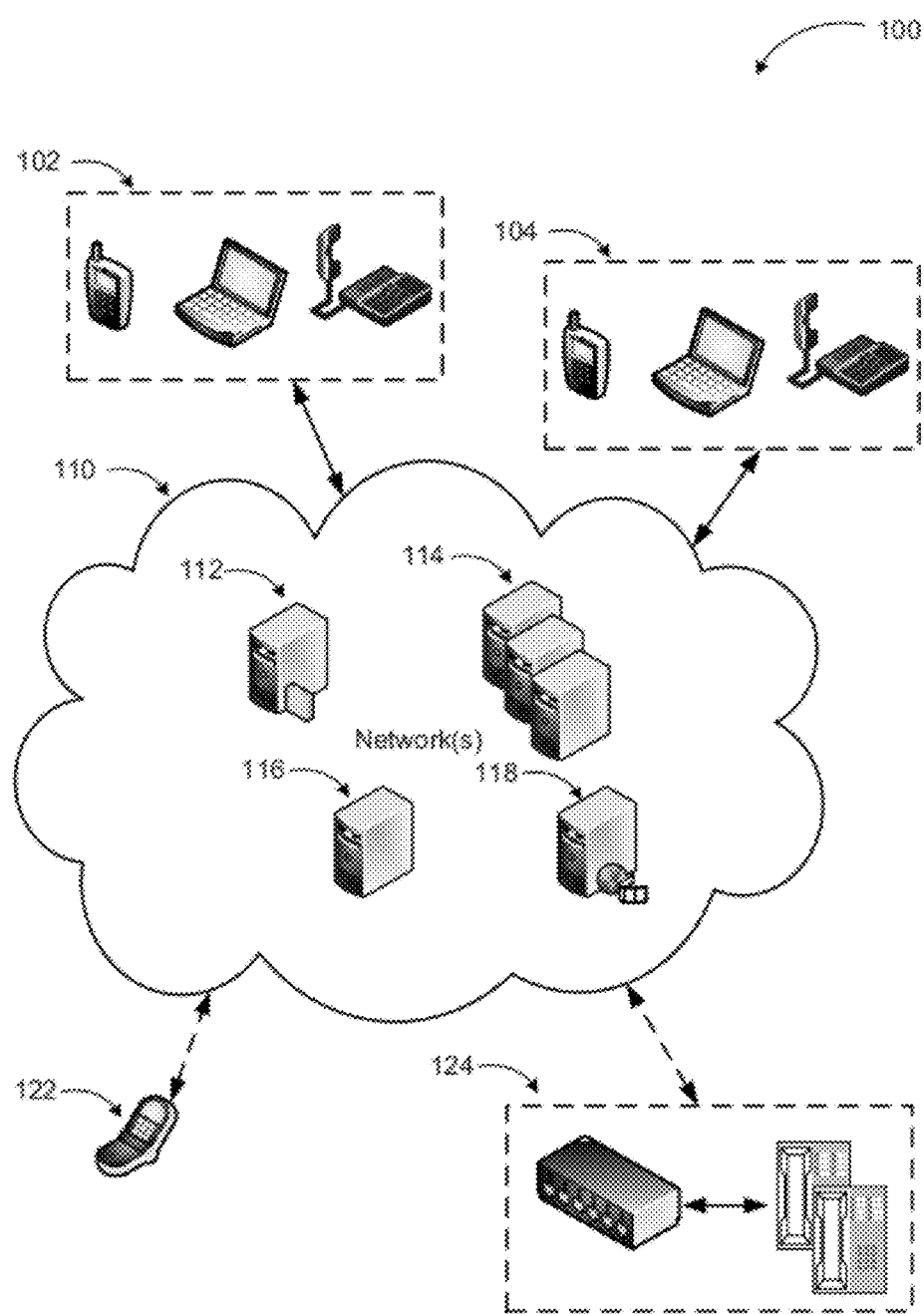
FIG. 1 is a diagram illustrating an example unified communications system.

As briefly described above, location information of a subscriber may be used to filter and order contact entities along with criteria based on presence attributes of the contact entities. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media. The computer program product may also be a propagated signal on a carrier (e.g. a frequency or phase modulated signal) or medium readable by a computing system and encoding a computer program of instructions for executing a computer process.

Throughout this specification, the term "platform" may be a combination of software and hardware components for managing presence and location based entity presentation. Examples of platforms include, but are not limited to, a hosted service executed over a plurality of servers, an application executed on a single server, and comparable systems. The term "server" refers to a computing device executing one or more software programs typically in a networked environment. More detail on these technologies and example operations is provided below.

Referring to FIG. 1, diagram 100 of an example unified communications system is illustrated. A unified communication system is an example of modern communication systems with a wide range of capabilities and services that can be provided to subscribers. A unified communication system is a real-time communications system facilitating instant messaging, presence, audio-video conferencing, and web conferencing functionality.

In a unified communication ("UC") system such as the one shown in diagram 100, users may communicate via a variety of end devices (102, 104), which are client devices of the UC system. Each client device may be capable of executing one or more communication applications for voice communication, video communication, instant messaging, application sharing, data sharing, and the like. In addition to their advanced functionality, the end devices may also facilitate traditional phone calls through an external connection such as through PBX 124 to a Public Switched Telephone Network ("PSTN"). End devices may include any type of smart phone, cellular phone, any computing device executing a communication application, a smart automobile console, and advanced phone devices with additional functionality.

UC Network(s) 110 includes a number of servers performing different tasks. For example, UC servers 114 provide registration, presence, and routing functionalities. Presence functionality enables the system to route calls to a user to anyone of the client devices assigned to the user based on default and/or user set policies. For example, if the user is not available through a regular phone, the call may be forwarded to the user's cellular phone, and if that is not answering a number of voicemail options may be utilized. Since the end devices can handle additional communication modes, UC servers 114 may provide access to these additional communication modes (e.g. instant messaging, video communication, etc.) through access server 112. Access server 112 resides in a perimeter network and enables connectivity through UC network(s) 110 with other users in one of the additional communication modes. UC servers 114 may include servers that perform combinations of the above described functionalities or specialized servers that only provide a particular functionality. For example, home servers providing presence functionality, routing servers providing routing functionality, and so on. Similarly, access server 112 may provide multiple functionalities such as firewall protection and connectivity or only specific functionalities.

Audio/Video (A/V) conferencing server 118 provides audio and/or video conferencing capabilities by facilitating those over an internal or external network. Mediation server 116 mediates signaling and media to and from other types of networks such as a PSTN or a cellular network (e.g. calls through PBX 124 or from cellular phone 122). Mediation server 116 may also act as a Session Initiation Protocol (SIP) user agent.

In a UC system, users may have one or more identities, which is not necessarily limited to a phone number. The identity may take any form depending on the integrated networks, such as a telephone number, a Session Initiation Protocol (SIP) Uniform Resource Identifier (URI), or any other identifier. While any protocol may be used in a UC system, SIP is a preferred method.

The SIP is an application-layer control (signaling) protocol for creating, modifying, and terminating sessions with one or more participants. It can be used to create two-party, multi-party, or multicast sessions that include Internet telephone calls, multimedia distribution, and multimedia conferences. SIP is designed to be independent of the underlying transport layer.

SIP clients may use Transport Control Protocol ("TCP") to connect to SIP servers and other SIP endpoints. SIP is primarily used in setting up and tearing down voice or video calls. However, it can be used in any application where session initiation is a requirement. These include event subscription and notification, terminal mobility, and so on. Voice and/or video communications are typically done over separate session protocols, typically Real Time Protocol ("RTP").

Because end devices in a UC system according to embodiments can provide and receive a variety of information about their status (hardware and/or software) and a user's status, a number of additional features may be incorporated into communication capabilities. For example, a user's location, availability, their preferences, and similar information may be exchanged prior to or during communication. The end devices in such a system may also receive information from other sources like a GPS server or a cellular system device including location information for other subscribers. Thus, a subscriber may know which entities (including, but not limited to, subscribers) are within a predefined vicinity of the subscriber, filter those entities based on a number of presence based attributes, and perform comparable actions.

While the example system in FIG. 1 has been described with specific components such as mediation server, A/V server, and similar devices, embodiments are not limited to these components or system configurations and can be implemented with other system configuration employing fewer or additional components. Functionality of systems enabling use of location and presence information may also be distributed among the components of the systems differently depending on component capabilities and system configurations.

Figure 2:
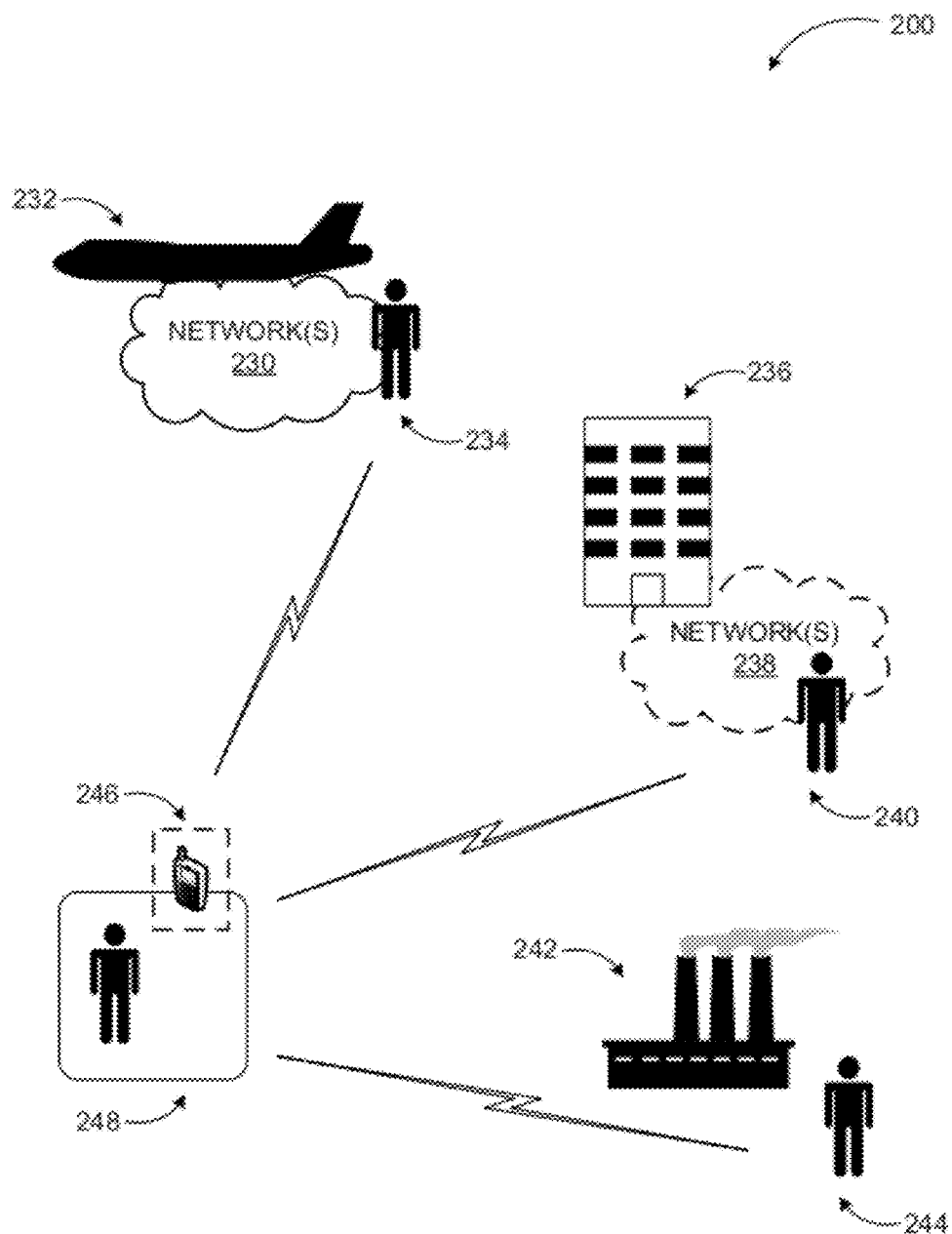
FIG. 2 illustrates example scenarios where various subscriber locations may be utilized to filter contact entities for presentation to the subscriber according to embodiments.

FIG. 2 illustrates example scenarios in diagram 200, where various subscriber locations may be utilized to filter contact entities for presentation to the subscriber according to embodiments. The locations and methods of obtaining location information presented here are for illustration purposes only and do not constitute a limitation on embodiments. Other locations and determination approaches may certainly be implemented using the principles described herein.

As discussed above, modern communication technologies such as UC services enable subscribers to utilize a wide range of computing device and application capabilities in conjunction with communication services. This means, a subscriber may use one or more devices (e.g. a regular phone, a smart phone, a computer, a smart automobile console, etc.) to facilitate communications. Depending on the capabilities of each device and applications available on each device, additional services may be enabled in conjunction with the available communications. Furthermore, a variety of communication modes such as voice communication, video communication, instant messaging, electronic mail, data sharing, application sharing, white-boarding, and similar modes, may be available depending on the capabilities of each device and applications available on each device.

Some of those advanced services may take advantage of the calling subscriber's location as well as other subscribers' location and other presence information. For example, available communication modes may be determined automatically and presented to a subscriber based on other subscribers' location, mobility, availability, or device capabilities. Similarly other services associated with enhanced communications such as scheduling meetings/conference calls, transmitting message, and comparable ones may be performed based on the location and presence information. Presence information includes dynamic information such as a subscriber's availability, schedule, device/application capabilities, as well as static information such as the subscriber's organizational attributes (e.g. member of particular project teams, groups), address, contact information, and professional attributes (e.g. expertise).

In a system according to embodiments, a filtered and ordered contact entity list may be provided to a subscriber based on the subscriber's location and contact entities' presence information. The term contact entity is used because systems according to embodiments are not limited to interactions between human subscribers. Non-human resources useful to a human subscriber may also be part of the subscriber's contact list. For example, computing network peripherals such as printers, scanners, and so on may be of interest to a subscriber, and just like human contacts, these object entities may be included in the contact list of the subscriber with their availability, location, capabilities, and similar attributes. Some of those attributes may be static (e.g. location), while others may be dynamic (e.g. availability, capability to handle color documents, etc.).

A subscriber may take advantage of the enhanced features provided by a system implementing embodiments in different scenarios. For example a subscriber may be in various locations at different times, such as at a factory 242 (subscriber 244), in a business place 236 (subscriber 240), and in an airplane 232 (subscriber 234). The location of the subscriber may be determined through various methods such as assistance from a Global Positioning Service (GPS) (e.g. subscriber 244), active connection of the subscriber to a particular network (e.g. subscriber 234) or a combination of both (e.g. subscriber 240). At each location, different contact entities may be available for the subscriber. For example, at business place 236, subscriber 240 may find experts in legal, medical, and engineering subjects to meet with; at factory 242, subscriber 244 may need to use a color printer, several of which may exist, but with differing capabilities (e.g. resolution, paper size, etc.). Thus, a system according to embodiments, may first determine the subscriber's location, nearby contact entities, and then order those entities based on their presence attributes (availability, capabilities, expertise, etc.). The ordering may also be done based on selection criteria from the subscriber himself/herself.

From a communication perspective, the filtered and ordered contact list may enable the subscriber to contact other subscribers 248 (at the same location or at other locations based on the subscriber's location preference) by providing the location and presence based information and even recommending available communication modes. According to another example scenario, a subscriber may be at a conference in another city away from their hometown. Employing the location and presence attribute based contact list filtering and ordering, the subscriber may find out about his/her colleagues that are attending the same conference, experts in his/her interest area attending the same conference (or nearby), or even find out about non-human resources in the vicinity that may be of interest to the subscriber.

Each of the contact entities in the filtered and ordered list may be provided with actionable items such as print function for a printer entity, call/email/schedule a meeting functions with human contacts, and similar actions. Thus, not only is the subscriber provided additional information to make informed and easy decisions, but also automated tools for taking action based on the additional information.

Figure 3:
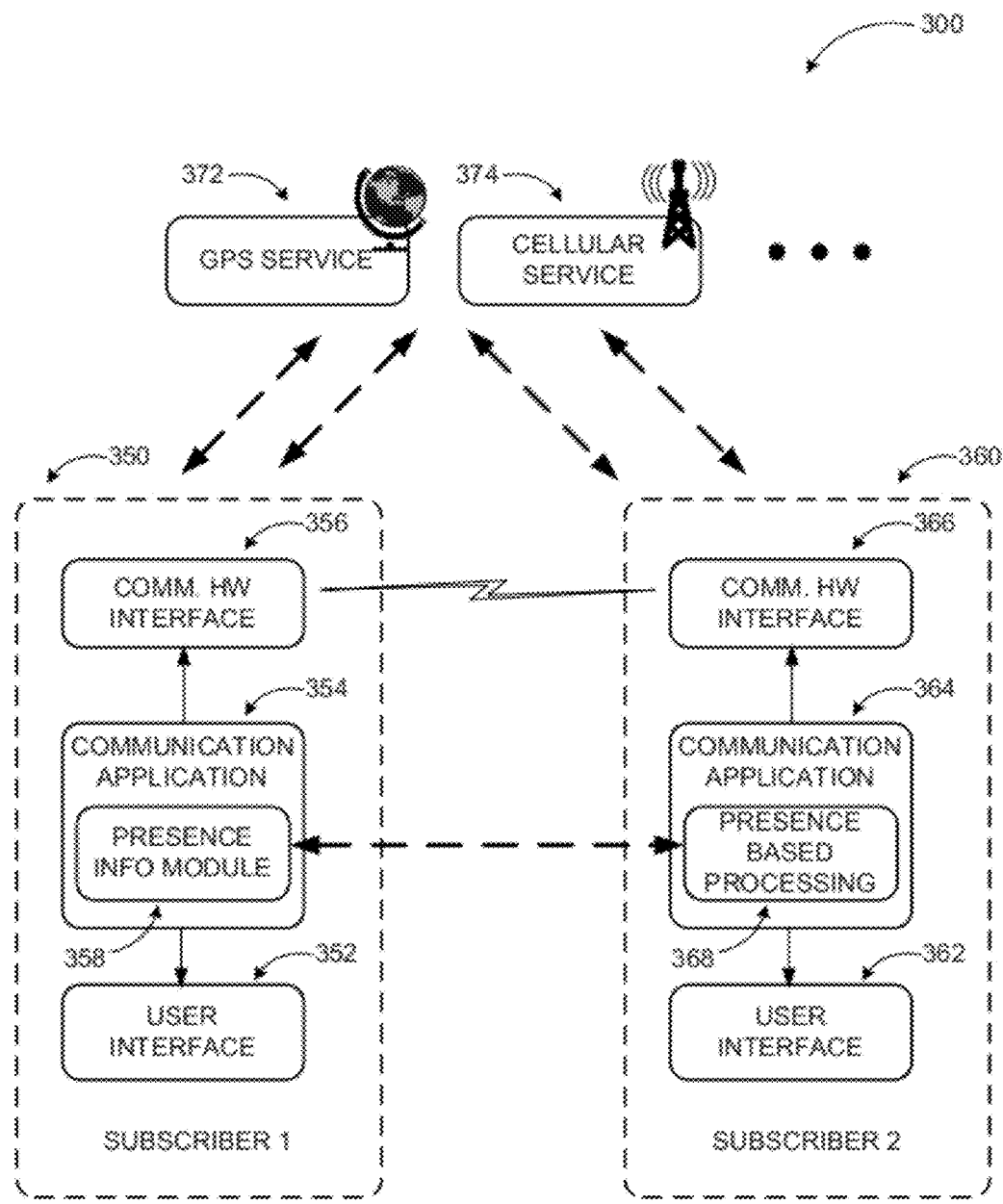
FIG. 3 illustrates communication application architectures on the calling and called party sides for implementing attribute and location based entity presentation.

FIG. 3 illustrates diagram 300 of communication application architectures on the calling and called party sides for implementing attribute and location based entity presentation. As discussed above, filtered and ordered contact lists based on location and presence information may be used to perform many actions through a variety of applications, including those operating non-human contact entities. However, communication with human contact through a variety of modes is a significant environment for systems according to embodiments. Communication applications providing enhanced communications and associated services may be individual applications executed on end devices interacting with other applications or they may be part of a hosted service remotely providing the services to connected subscribers.

On subscriber 1 (350) side, communication application 354 may include a presence information module 358 for maintaining information related to presence attributes of the subscriber 1 such as subscriber's dynamic (and static) information (address, contact numbers, professional attributes, schedule, a location of the subscriber and similar information. A portion of the information may be obtained from local or remote resources such as GPS service 372, cellular service 374, local gyro-sensors (not shown), wireless network identifiers, and comparable resources. Presence information may then be published to make other subscribers aware. User interface 352 may be used to enable subscriber 1 to enter additional information, make selections, and so on. Communication hardware interface 356 provides connection with available hardware components such as transceivers for various communication modes to communication application 354. Of course all or a portion of the presence information for subscriber 1 may also be maintained and published by a presence server of the communication system.

On the subscriber 2 (360) side, a parallel structure includes communication hardware interface 366, user interface 362, and communication application 364. Presence based processing module 368, which may be a separate application or part of communication application 364, is configured to determine the location of subscriber 2 through any of the above discussed approaches such as GPS 372 or cellular service 374, receive the presence information from subscriber 1 and other subscribers, and determine a filtered and ordered list. If subscriber 1 is within a predefined vicinity of subscriber 2, he/she may be included in the list. The list may be ordered based availability, expertise, capabilities, or scheduling status of nearby contacts. Furthermore, the location and presence information may be used to determine which communication mode(s) can be enabled/recommended to subscriber 2 through user interface 362.

The filtered and ordered list of nearby contacts based on location and presence information may be generated using one or more algorithms such as a branch-and-bound algorithm, a progressive improvement algorithm, a heuristic algorithm, or another algorithm. While specific computing devices and communication related tasks have been described above, these are for illustration purposes only and do not constitute a limitation on embodiments. Many other hardware environments and communication related tasks may be implemented using the principles described herein.

Figure 4:
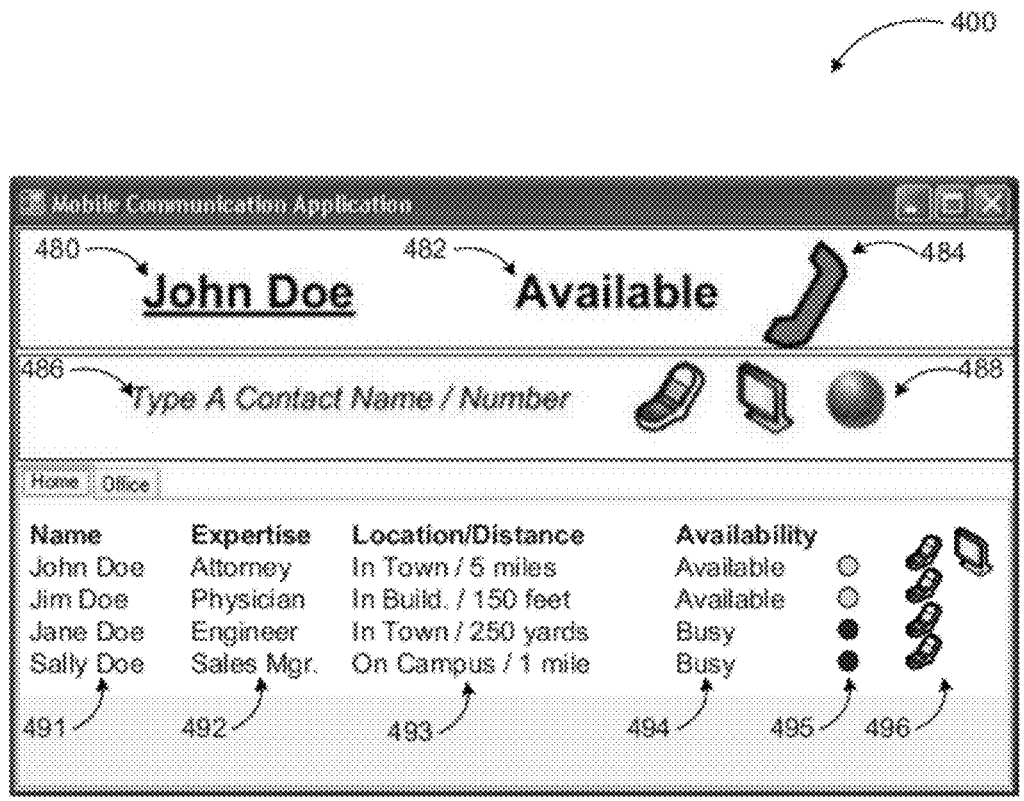
FIG. 4 is a screenshot of an example communication application user interface illustrating location and attribute based filtering and ordering according to embodiments.

FIG. 4 is a screenshot of an example communication application user interface 400 illustrating location and attribute based filtering and ordering according to embodiments. While a user interface for an application enabling location and attribute based filtering and ordering may take any form and shape, and include a variety of elements, example ones are shown in FIG. 4 to illustrate aspects of the present disclosure.

The user interface in screenshot 400 includes the user's name (480) and current status (482) along with an icon for initiating a call (484). Also included are an input area 486 for entering a contact name or number to place a call (initiate vide communication, send an instant message, and comparable communications) and icons of available communication modes 488 on the particular device executing the communication application.

According to one embodiment, the user interface may present an aggregated contact list generated based on the subscriber's (identified by user name 480) location. The user interface may list the contact list (such as those in a favorite contacts list) by name (491), expertise (492), location and distance from the subscriber (493), and availability (494). Graphic schemes that also employ color schemes may be used to underline the status (495) of each contact as well as to display available communication modes (496). While the contacts in the example user interface are all human, non-human resources may also be listed in the contact list. The user interface may be dynamically modified to display appropriate icons for those cases. For example, a networked printer may be shown as being within the vicinity along with icons indicating available paper sizes or printing modes (e.g. color, black/white).

A filtered and ordered contact list according to embodiments may be updated upon request by the subscriber, periodically, or upon receiving a presence status change for one of the contacts. While the example user interface is for a communication application, other functionality may also be provided (such as printing through a contact) by providing a link to relevant application(s).

Figure 5:
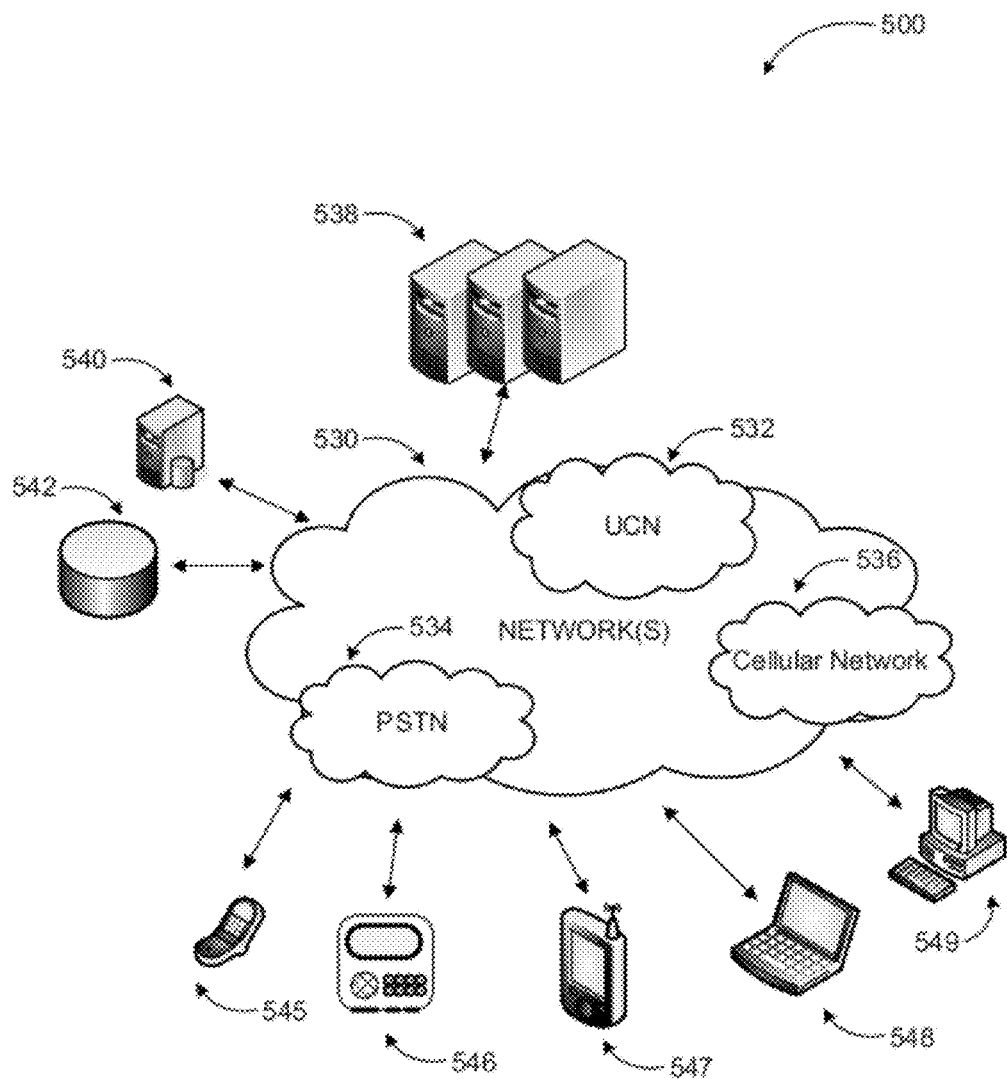
FIG. 5 is a networked environment, where a system according to embodiments may be implemented.

FIG. 5 is an example networked environment, where embodiments may be implemented. A platform providing unified communication services may be implemented via software executed over one or more servers 538 such as a hosted service. The platform may communicate with consuming applications on individual computing devices such as a cellular phone 545, smart automobile console 546, a handheld computer 547, a laptop computer 548, and desktop computer 549 through network(s) 530.

As discussed previously, computing devices 545-549 are used to facilitate communications through a variety of modes between subscribers of the UC service. For a subscriber location information and presence attributes of entities in the user's contact list may be received through a variety of means and processed to present a filtered and/or ordered list. Information associated with subscribers and facilitating communications may be stored in one or more data stores (e.g. data store 542), which may be managed by any one of the servers 538 or by database server 540.

Network(s) 530 may comprise any topology of servers, clients, Internet service providers, and communication media. A system according to embodiments may have a static or dynamic topology. Network(s) 530 may include a secure network such as an enterprise network, an unsecure network such as a wireless open network, or the Internet. Network(s) 530 may also comprise a plurality of distinct networks such as UC network 532, PSTN 534, and cellular network 536. Network(s) 530 provides communication between the nodes described herein. By way of example, and not limitation, network(s) 530 may include wireless media such as acoustic, RF, infrared and other wireless media.

Many other configurations of computing devices, applications, data sources, and data distribution systems may be employed to implement a system for using subscriber location and contact presence attributes in determining an ordered available contact list. Furthermore, the networked environments discussed in FIG. 5 are for illustration purposes only. Embodiments are not limited to the example applications, modules, or processes.

Figure 6:
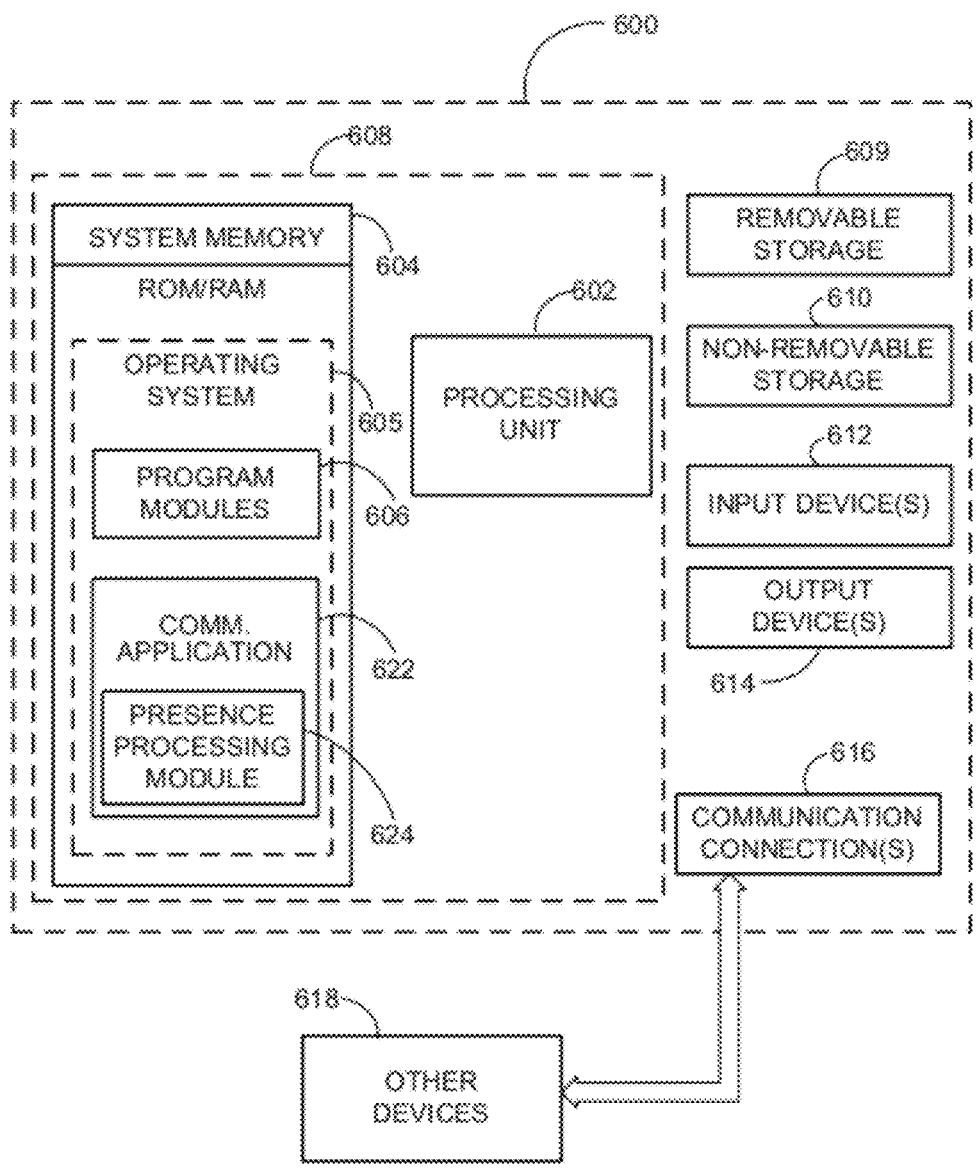
FIG. 6 is a block diagram of an example computing operating environment, where a communication application according to embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computer 600. In a basic configuration, computer 600 may include at least one processing unit 602 and system memory 604. Computer 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, communication application 622, and presence processing module 624.

Communication application 622 and presence processing module 624 may be separate applications or integral modules of a hosted service that provides communication services to client applications/devices. Presence processing module 624 may analyze location information for a subscriber using computer 600 and presence data for contact entities received from one or more data source applications. Based on the analysis results, communication application 622 may filter the contact entities based on the subscriber's location and order based on contact entity presence attributes. This basic configuration is illustrated in FIG. 6 by those components within dashed line 608.

Computer 600 may have additional features or functionality. For example, the computer 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computer 600. Any such computer readable storage media may be part of computer 600. Computer 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computer 600 may also contain communication connections 616 that allow the device to communicate with other devices 618, such as over a wireless network in a distributed computing environment, a satellite link, a cellular link, and comparable mechanisms. Other devices 618 may include computer device(s) that execute communication applications, GPS satellites providing GPS data, cellular towers providing external data and/or positioning data, and comparable devices. Communication connection(s) 616 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
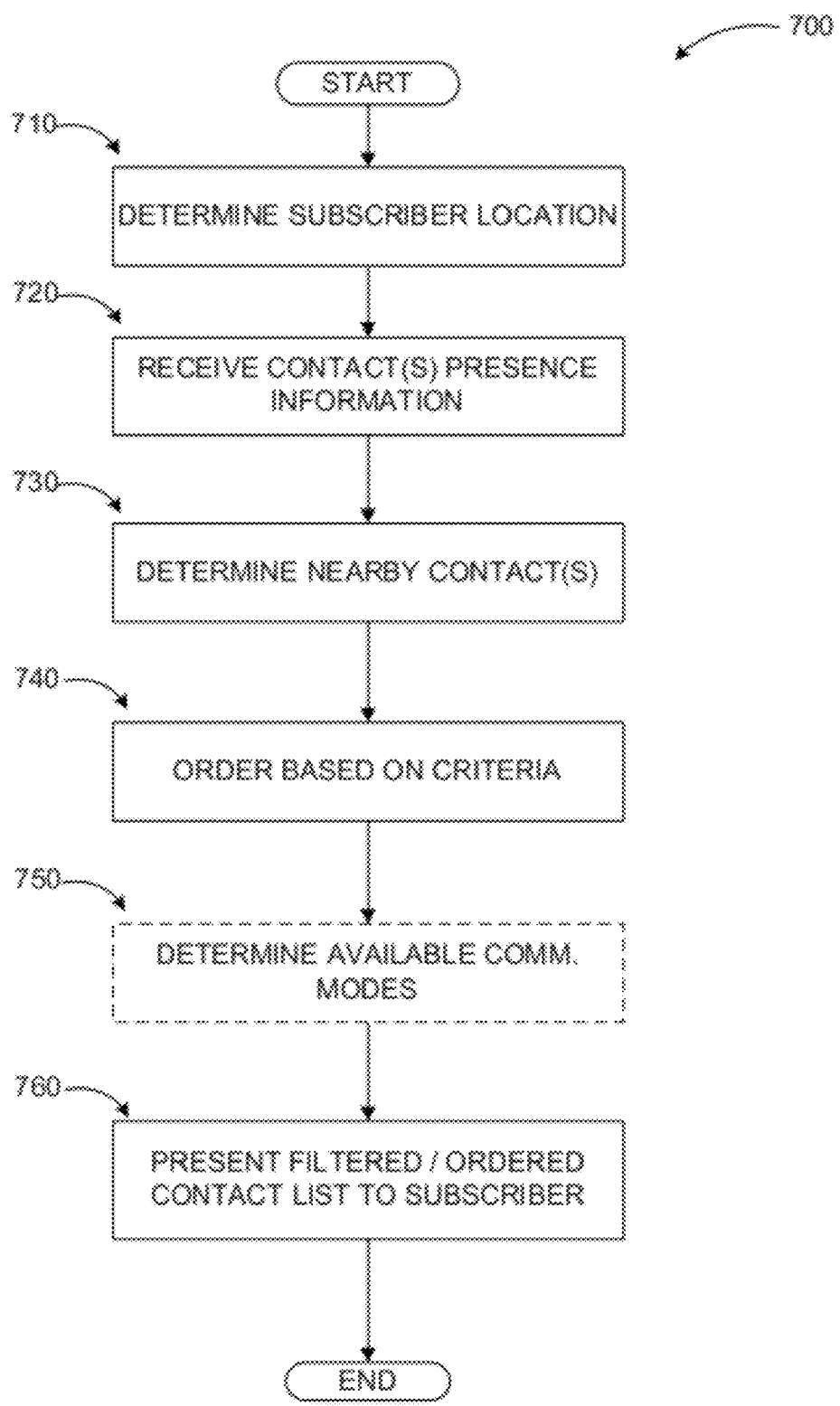
FIG. 7 illustrates a logic flow diagram for using called subscriber's location in facilitating presence based communications according to embodiments.

FIG. 7 illustrates a logic flow diagram 700 for filtering and ordering contact entity presence information based on user location and contact attributes according to embodiments. Process 700 may be implemented as part of a unified communication system communicator application such as the one described above in conjunction with FIGS. 3 and 4.

Process 700 begins with operation 710, where subscriber location is determined through a variety of approaches including, but not limited to, GPS information, cellular network information, other network information. At operation 720, presence information for contacts associated with the subscriber is received. Presence information may include location, availability, contact information, expertise, capabilities, and similar information. At operation 730, contacts are filtered according to a predefined criterion based on the subscriber's location. The criterion may be customized by the subscriber selecting or modifying default rules. The list of contact meeting the location based criterion is ordered at operation 740 based on the presence attributes of the contacts. The prioritization may be performed according to explicit subscriber preferences or inferred rules automatically determined by the communication application.

Operation 740 may be followed by optional operation 750, where available/recommended communication modes may be determined based on the subscriber's location and the contacts' presence information. At operation 760, the subscriber is presented with the filtered and ordered contacts list enabling him/her to select actions to be performed such as establishing a communication session with one of the contacts, scheduling a meeting, and similar operations.

The operations included in process 700 are for illustration purposes. Using subscriber location and contact entity presence attributes in determining presented entities may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part on a computing device for using location and presence attributes in processing contact lists, the method comprising:

determining human and non-human contact entities within a predefined distance of a subscriber based on received location information associated with the subscriber;

receiving published dynamic and static presence information associated with the human and non-human contact entities within the predefined distance;

prioritizing the human and non-human contact entities within the predefined distance employing the presence information according to one of a default rule and a user preference;

presenting the prioritized human and non-human contact entities to the subscriber such that at least one communication mode from a set of communication services is provided through an actionable item associated with the human and non-human prioritized contact entities;

recommending the at least one available communication mode to the subscriber based on the location of the subscriber and the presence information of the human and non-human contact entities;

facilitating communication with one of the nearby human and non-human contact entities upon selection of the nearby contact entity and a communication mode by the subscriber; and in response to receiving a selection of the nearby contact entity and the communication mode by the subscriber, providing the selected communication mode by activating an application associated with the selected communication mode.

2. The method of claim 1, wherein the location information associated with the subscriber is determined based on at least one from a set of: Global Positioning Service (GPS) information, cellular network information, and information obtained from an active connection of the subscriber to a non-cellular network.

3. The method of claim 1, wherein the predefined distance is determined based on at least one default rule customized by the subscriber.

4. The method of claim 1, wherein the non-human contact entities include one or more of: computing network peripherals, a printing device, and an imaging device.

5. The method of claim 4, wherein the nearby contact entities are ordered based on one of: explicit subscriber preferences and automatically inferred rules associated with the presence information.

6. The method of claim 1, wherein the ordered nearby contact entities are updated upon one of: expiration of a predefined time period a request by the subscriber, a change of the subscriber's location, and a change in the presence information of any one of the contacts.

7. The method of claim 1, wherein the nearby contact entities are ordered based on the presence information employing at least one from a set of: a branch-and-bound algorithm, a progressive improvement algorithm, and a heuristic algorithm.

8. The method of claim 1, wherein the nearby contact entities are ordered and presented to the subscriber by an application executed on at least one from a set of: a smart phone, a laptop computer, a desktop computer, a handheld computer, and a smart automobile console.

9. A system for using location and presence attributes in processing contact lists, the system comprising:
- a server and a communication management framework, the server configured to execute the communication management framework and further configured to:
- determine human and non-human contact entities within a predefined distance of a subscriber based on received location information associated with the subscriber;
- receive published dynamic and static presence information associated with the human and non-human contact entities within the predefined distance;
- prioritize the human and non-human contact entities within the predefined distance employing the presence information according to one of a default rule and a user preference;
- present the prioritized human and non-human contact entities to the subscriber such that at least one communication mode from a set of communication services is provided through an actionable item associated with the human and non-human prioritized contact entities;
- recommend the at least one available communication mode to the subscriber based on the location of the subscriber and the presence information of the human and non-human contact entities;
- facilitate communication with one of the nearby human and non-human contact entities upon selection of the nearby contact entity and a communication mode by the subscriber; and
- in response to receiving a selection of the nearby contact entity and the communication mode by the subscriber, provide the selected communication mode by activating an application associated with the selected communication mode.

10. The system of claim 9, wherein the server is further configured to enable the communication management framework to activate another application for performing an action selected by the subscriber from a presented contact list.

11. The system of claim 9, wherein elements and configuration of a user interface for presenting the prioritized human and non-human contact entities to the subscriber are dynamically modified based on a type and presence attributes of the nearby contact entities.

12. The system of claim 9, wherein the the nearby contact entities and associated actionable items are presented employing at least one from a set of: a graphical shape-based scheme, an icon scheme, a color scheme, and a text-formatting scheme.

13. The system of claim 9, wherein the non-human contact entities include one of a printing device and an imaging device, and wherein the presence information includes at least one from a set of: an availability of the device, a network address of the device, an access attribute associated with the device, and a document size information associated with the device.

14. The system of claim 9, wherein the human contact entities are ordered based on at least one from a set of: their expertise, their relationship to the subscriber, and their availability.

15. A computer-readable storage medium having instructions stored thereon for using location and presence attributes in processing contact lists, the actions comprising:
- determine human and non-human contact entities within a predefined distance of a subscriber based on received location information associated with the subscriber;
- receive published dynamic and static presence information associated with the human and non-human contact entities within the predefined distance;
- prioritize the human and non-human contact entities within the predefined distance employing the presence information according to one of a default rule and a user preference;
- present the prioritized human and non-human contact entities to the subscriber such that at least one communication mode from a set of communication services is provided through an actionable item associated with the human and non-human prioritized contact entities;
- recommend the at least one available communication mode to the subscriber based on the location of the subscriber and the presence information of the human and non-human contact entities;
- facilitate communication with one of the nearby human and non-human contact entities upon selection of the nearby contact entity and a communication mode by the subscriber; and
- in response to receiving a selection of the nearby contact entity and the communication mode by the subscriber, providing provide the selected communication mode by activating an application associated with the selected communication mode.

16. The computer-readable storage medium of claim 15, wherein the instructions further comprise:
- automatically prioritize human contact entities based on their availability, schedule, location, and expertise; and
- enable the subscriber to perform at least one from a set of: schedule a meeting with, place a call to, send an email to, and send an instant message to one of the prioritized entities based on the prioritization.

17. The computer-readable storage medium of claim 15, wherein the prioritized human and non-human contact entities are updated in response to a change in a predefined number of human and non-human contact entities.

* * * * *